June 13, 1967 W. SCHELKMANN 3,325,326
METHOD AND APPARATUS FOR RECAPPING TIRES
WITH PREVULCANIZED PROFILE TREADS
Filed May 4, 1964
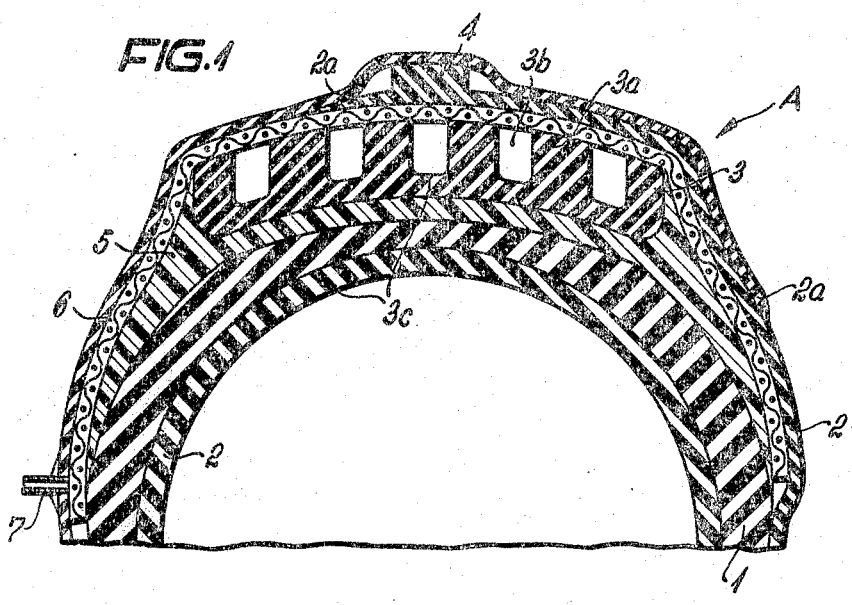
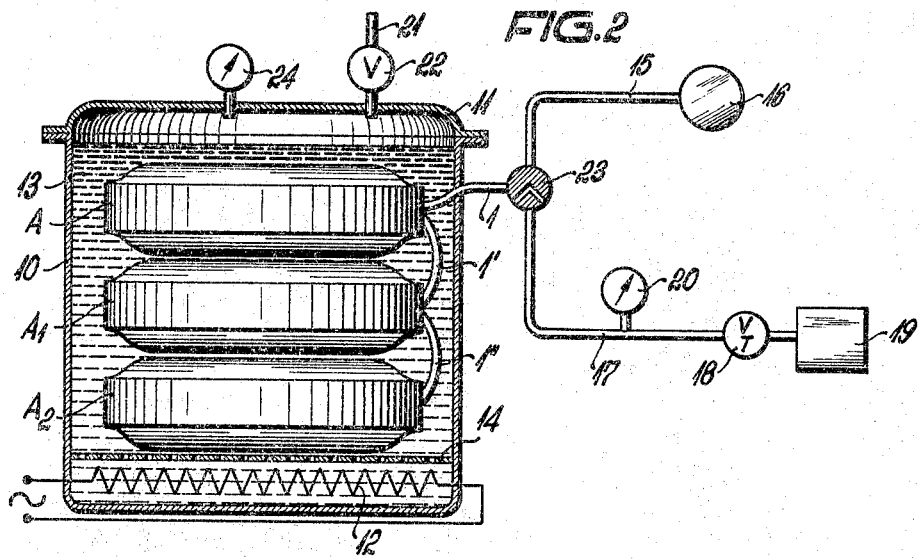
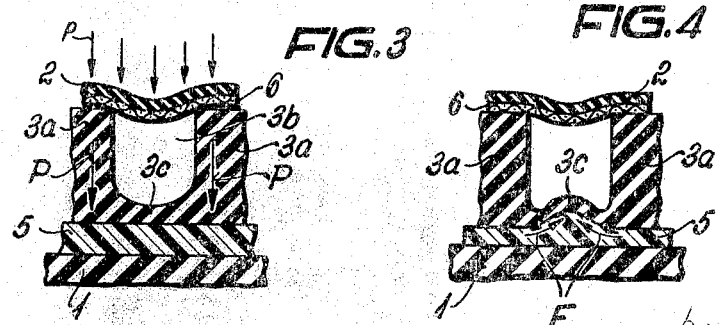
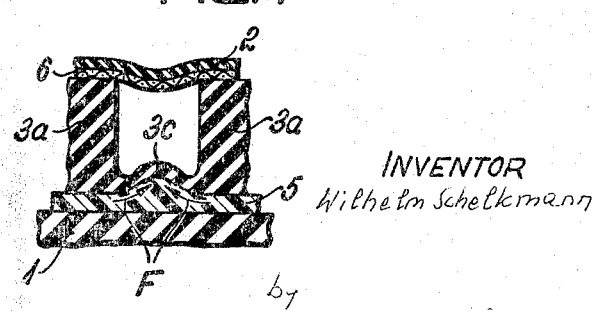
INVENTOR
Wilhelm Schelkmann
by
Michael J. Striker

United States Patent Office 3,325,326
Patented June 13, 1967

3,325,326
METHOD AND APPARATUS FOR RECAPPING TIRES WITH PREVULCANIZED PROFILE TREADS
Wilhelm Schelkmann, Crengeldanzstrasse 85, Witten (Ruhr), Germany
Filed May 4, 1964, Ser. No. 364,385
Claims priority, application Germany, May 3, 1963, Sch 33,231
21 Claims. (Cl. 156—96)

The present invention relates to a method and apparatus for recapping tires with pre-vulcanized profiled treads by means of a layer of binder material sandwiched between the outer tire surface and the tread, in which the parts to be united by vulcanization are wrapped in a flexible air-tight cover sheet so that the cover sheet forms a closed wrapper over the parts, and in which air and other gases are removed from the closed wrapper so that the parts will be pressed by atmospheric pressure substantially without clearance against each other, while all air and gas enclosures between the superimposed parts will be removed from the closed wrapper. The thus assembled parts enclosed air-tightly in the wrapper are then subjected in an autoclave to heat and pressure whereby the tread is permanently bonded to the outer tire surface by the layer of binder material.

The method so far described is known in the art and this method is for instance described in the U.S. Patent 2,966,936.

Experience has shown that considerable difficulties are encountered when this method is used for recapping tires with profiled treads as they are used in snow tires, tires for tractors or for earth moving machinery in which the outer tread portion has pronounced ridges separated by relatively deep cavities. When treads of this kind are used for recapping tires according to the known method, the pressure exerted in the autoclave on the outer surface of the wrapper will be transmitted to the layer of binder material, which may be, for instance, unvulcanized rubber, only through the ridge portions of the tread so that the layer of binder material will be subjected at adjacent portions thereof to unequal pressures, that is, the pressure on the portion of the layer of binder material beneath the ridges of the tread will be much greater than on the portions of the layer of binder material beneath the tread cavities. This unequal pressure will cause unequal flow of the material of the binder layer, when the same softens under the influence of heat and pressure in the autoclave, and this unequal pressure and resulting unequal flow will produce a reduction of the thickness of the binder layer at portions thereof beneath the ridges and corresponding increase of the thickness of the binder layer at portions thereof beneath the cavities. This in turn will result in distortion of the tread portions, and this may also result in porosity of the binder layer portions of increased thickness.

It is an object of the present invention to overcome these disadvantages of the method and apparatus known in the art for recapping tires and especially recapping tires with profiled treads having pronounced ridges separated by relatively deep cavities.

It is a further object of the present invention to provide for a method and apparatus for recapping tires with profiled treads in which the tread profiles are not distorted during vulcanization of the treads to the tires.

It is an additional object of the present invention to provide for a method and apparatus for recapping tires with profiled treads in which the ridges of the treads are connected to each other by a base portion which is relatively thin and which avoids nevertheless distortion of the tread during the vulcanization process.

With these objects in view, the method according to the present invention of recapping tires with prevulcanized profile treads comprises the steps of forming an assembly consisting essentially of a tire, a profiled tread superimposed upon the outer surface of the tire, and a layer of binder material sandwiched between the outer tire surface and the tread, wrapping a flexible cover sheet over all components of the assembly which are to be connected so that the cover sheet forms a closed wrapper over the components, removing air from the closed wrapper so that the components will be pressed by atmospheric pressure substantially without clearance against each other while all air enclosures between the superimposed tire, tread and layer of binder material will be removed, treating the assembly in the closed wrapper to force the layer of binder material in the closed wrapper to permanently bond the tread to the tire's surface, and maintaining during the last mentioned step a pressure difference of substantially 1 kg./cm.$^2$ between the inner and outer surface of the cover sheet so as to avoid distortion of the profiled tread during such treatment of the assembly.

The layer of binder material is preferably a layer of unvulcanized rubber and the assembly in the closed wrapper is placed in an autoclave to be subjected to heat and pressure to vulcanize the layer of unvulcanized rubber to thus permanently bond the tread to the tire surface. According to the present invention, the pressure difference between the inner and outer surface of the cover sheet may also be fully equalized after a predetermined time period, for instance after such time in which at least the edge portions of the tread are already bonded to the outer tire surface.

The maintenance of a pressure difference of 1 kg./cm.$^2$ between the inner and outer surface of the wrapper and any desired equalizing of the inner and outer pressure is produced according to the present invention by feeding, during increase of the pressure in the autoclave and resulting increase of the pressure on the outer surface of the closed wrapper, a pressure fluid into the interior of the closed wrapper so as to maintain the desired pressure difference between the inner and outer surface of the wrapper or to completely equalize the pressures. The pressure fluid is fed into the closed wrapper in such a manner that the pressure fluid will also completely fill the cavities of the tread profile located between the ridges of the tread. The pressure fluid used to increase the pressure at the interior of the wrapper may be either a gas or a liquid under pressure.

For removing the air from the interior of the enclosed wrapper, the cover sheet is preferably provided with a tubular extension communicating with the interior of the wrapper and the same tubular extension may also be used according to the present invention for subsequent feeding of the pressure fluid into the interior of the closed wrapper. For this purpose, a two way valve is preferably connected to the outer end of the tubular extension, and this valve is also connected to a source of vacuum as well as to a source of pressure fluid in such a manner that the interior of the wrapper may either be connected to the source of vacuum so that the interior of the wrapper may be evacuated, or that the interior of the wrapper may be connected to the source of pressure fluid, so that when the pressure on the exterior of the wrapper increases, the pressure difference between the outer and inner surface of the wrapper may be held to the desired difference of 1 kg./cm.$^2$ or be completely equalized.

The maintenance of a small pressure difference between the inner and outer surface of the wrapper will avoid the aforementioned unequal flow of the binder layer and resulting distortion of the tread portions. This has the advantage that the tread can be made with a base portion, connecting the ridges, having a thickness which is considerably smaller as is necessary with treads used in the method according to the prior art, so that the method according to the present invention permits a considerable reduction of the tread material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partial cross-section through an assembly comprising essentially a tire, a tread portion superimposed on the outer tire surface and a layer of binder material sandwiched between tread and tire, and enclosed in a cover sheet;

FIG. 2 is a schematic partly cross-sectioned view of the apparatus according to the present invention;

And FIGS. 3 and 4 are partial cross sections of the assembly shown in FIG. 1 and illustrating the influence of unequal pressure on the layer of binding material between tread and tire.

Referring now to the drawings and particularly to FIG. 1, it will be seen that according to the method of the present invention, a tread 3 having pronounced ridges 3a separated by relatively deep cavities 3b is superimposed upon the outer surface of the tire 1 with a layer of binder material 5, preferably of unvulcanized rubber, sandwiched between the tread and the outer tire surface. The aforementioned components are enclosed in an air-tight cover sheet 2 which is preferably formed from a single sheet of flexible material as described in detail in the aforementioned U.S. Patent 2,966,936. The flexible cover sheet 2 is preferably U-shaped and covers the outside as well as the inside of the assembly. The cover is preferably formed with extending lips 2a which overlap each other and one of these lips may be formed with a reinforcement 4.

Instead of using a cover sheet 2 as shown in FIG. 1 which completely encloses the assembly of tread, binder layer, and tire on the inner and outer surface of the assembly, it is also possible to use a cover sheet which covers only the tread, the portions of layer of binder material extending laterally beyond the tread, and part of the outer tire surface adjacent to the edge portions of the layer of binder material, and such a cover sheet is connected to the side walls of the tire in a fluid-tight manner as shown and described in my co-pending application Serial Number 256,725, now U.S. Patent 3,207,647, issued Sept. 21, 1965. A tubular extension 7 is fluid tightly connected to the cover sheet 2 to communicate at one end thereof with the interior of the cover sheet 2. Preferably, a layer of fluid-permeable material is sandwiched between the outer surface of the tread and the inner surface of the cover sheet, and this layer of fluid-permeable material 6 extends at least up to the inner end of the tubular extension. The layer of fluid-permeable material 6 is made from such material that the material of the binder plate during vulcanization will not be bonded to this layer, or a thin layer of a material which will not be bonded to the binder material during vulcanization of the latter, is sandwiched between the inner surface of the layer of fluid-permeable material 6 and the portions of the binder material 5 which will come in contact with the layer 6. The layer 6 may for instance be formed from wire matting. It is mentioned that in FIG. 1 the layer of binder material 5 is shown in its finished form after it has been subjected to heat and pressure and after the material of the edge portions of this layer have been softened and flowed to fill out all empty spaces between the outer tire surface and the inner surface of the layer 6.

After the assembly formed by the tire 1, the tread 3, and the layer of binder material 5 sandwiched between tread and tire has been enclosed in the cover sheet 2, so that the cover sheet forms a closed wrapper over the aforementioned components, air is removed from the closed wrapper, preferably by evacuating the air through the tubular extension 7 from the interior of the closed wrapper so that the components enclosed in the wrapper will be pressed by atmospheric pressure substantially without clearance against each other, while all air and/or additional gas enclosures between the superimposed tire 1, tread 3, and layer of binder material 5 will be removed. The assembly A formed by the aforementioned components enclosed in the wrapper is then subjected to heat and outer pressure to cause the layer of binder material to permanently bond the tread 3 to the outer tire surface. During application of heat and pressure on the assembly, the layer of binder material 5, preferably formed from unvulcanized rubber, will first soften and if a considerable pressure difference would be maintained between the outer and the inner surface of the cover sheet 2, an unequal pressure would be exerted on adjacent portions of the softened layer of binder material.

The result of such unequal pressure on adjacent portions of the layer of binder material is illustrated in FIGS. 3 and 4. As shown in FIG. 3, pressure on the outer surface of the cover sheet 2, as indicated by the arrows p, will be transmitted through the ridges 3a of the tread, as indicated by the arrows P, to portions of the layer of binder material 5 located beneath the ridge portions 3a of the tread, while substantially lower pressures will be transmitted to the portions of the layer of binder material located beneath the base portion 3c of the tread connecting adjacent ridge portion 3a with each other. This unequal pressure on adjacent portions of the layer of binder material 5 will cause the material of the layer 5 beneath the ridge portion 3a of the tread to flow, as indicated by the arrows F in FIG. 4, to result in a corresponding reduction of the cross section of the portions of the layer 5 beneath the ridge portion 3a and a corresponding increase of the portions of the layer 5 beneath the base portion 3c of the tread. The tread portion 3c will therefore bulge inwardly into the cavity 3b between adjacent ridges 3a, which in turn will result in an overall reduction in the width of the tread and distortion of the various tread portions. The increase of the thickness of the binder layer portion located beneath the tread portion 3c may also cause a porosity in the raised portions of the layer of binder material.

To avoid such distortions of the tread and unequal flow of the layer of binder material during increase of the pressure on the outer surface of the cover sheet 2, pressure fluid is fed, according to the present invention, into the interior of the cover sheet 2 so as to maintain during increase of the pressure onto the outer surface of the cover sheet a pressure difference between the outer and inner surface of the cover sheet not substantially exceeding 1 kg./cm$^2$. Preferably pressure fluid is fed into the interior of the closed wrapper through the tubular extension 7 which has been used before for evacuating the interior of the closed wrapper and due to the layer of fluid permeable material 6, such pressure fluid will also penetrate into the cavities 3b formed between the ridges 3a of the tread so that there will be only a very small difference between the pressure exerted on the portions of the layer of binder material 5 located beneath the ridges 3a and the pressure produced on the portions of the binder layer located beneath the base portions 3c of the tread. Preferably, the pressure difference between the inner and outer surface of the cover sheet is completely equalized after a predetermined time period, that is for instance after such a time in which the outer edge portions of the layer of binder material 5 are already boneded to the tire 1, and after such time and equalizing of the pressure there will be no pressure difference on adjacent portions of the layer of binder material. Therefore, unequal flow of the layer of binder material and the resultant disadvantages described above will be completely avoided with the method according to the present invention.

The above described method is preferably carried out in an apparatus as shown in FIG. 2. FIG. 2 shows schematically a pressure vessel 10 of an autoclave closed by cover 11 and partly filled with a liquid 13. The cover 11 is preferably hinged to the lower part of the autoclave and the cover is constructed to be held in close substantially fluid-tight condition by any means known in the art. Heating means 12 to heat the liquid 13 of the autoclave are shown at the bottom of the vessel 10 and this heating means 12 may for instance consist of an electric heating coil adapted to be connected to a source of electric current. Gas under pressure may be fed through a flexible conduit 21 connected to the cover into the interior of the pressure vessel, which conduit 21 may be opened and closed by a valve 22. A manometer 24 is also preferably provided to indicate the pressure maintained in the interior of the autoclave. The assembly A composed of a tread 3, a tire 1, and a layer of binder material 5 enclosed in a fluid-tight cover sheet 2 as shown and described in connection with FIG. 1, preferably with a layer 6 of fluid permeable material sandwiched between the outer surface of the tread 3 and the inner surface of the cover 2 is placed and in the liquid of the autoclave or a plurality of such assemblies are placed thereinto as shown in FIG. 2, in which three assemblies A, A1, and A2 are superimposed upon each other in the interior of the autoclave. To maintain the lowermost of the assemblies A2 spaced from the heating coil 12, a perforated plate 14 is preferably provided extending transversely through the vessel 10 above and spaced from the heating coil 12 and connected in a known manner at edge portions thereof to the inner surface of the vessel 10. If a plurality of assemblies A, A1, and A2, etc., are superimposed upon each other in the autoclave, then all cover sheets except the cover sheet of the lowest assembly are preferably provided with two tubular extensions, and one of the tubular extensions of the uppermost assembly A is connected to one tubular extension of the intermediate assembly A1, as shown at 7' in FIG. 2, whereas the other tubular extension of the intermediate assembly A1, is connected to the tubular extension of the lowermost assembly A2 as shown at 7'' in FIG. 2. The other tubular extension 7 of the uppermost assembly A extends in a fluid-tight manner through the wall of the vessel 10 to the exterior of the autoclave and is connected at the outer end thereof to a two-way valve 23. The valve 23 is connected through conduit 15 to a source of vacuum 16, which may be for instance a vacuum pump, and valve 23 is also connected through a conduit 17 to a source of pressure fluid 19, which may be a bottle of compressed gas or a compression pump. A throttle valve 18 is preferably provided in the conduit 17 to regulate the pressure of the medium flowing from the source of pressure 19 to the valve 23 and the arrangement preferably includes also a manometer 20 downstream of the valve 18 to indicate the pressure of the medium flowing to the valve 23.

The operation of the apparatus shown in FIG. 2 will be self evident from the preceding description of the method of the present invention. The assemblies A, A1 and A2 are placed into the liquid of the autoclave, the cover is then closed, and air from the interiors of the assemblies A, A1, and A2 is then evacuated by connecting the tubular extension 7 of the uppermost assembly A through the appropriately turned two-way valve 23 to the source of vacuum 16. Afterwards the heating coil 12 is energized to heat the liquid 13 in the autoclave and simultaneously pressure fluid is fed through the conduit 21 into the interior of the autoclave above the level of the liquid therein so that the liquid 13 may be heated to a temperature necessary for vulcanizing the layer of binder material 5 in the various assemblies without causing evaporation of the liquid. During increase of the pressure in the autoclave to a pressure of approximately 4 atmospheres, the valve 23 is turned to connect the tubular extension 7 with conduit 17 so that pressure fluid from the source of pressure 19 may be fed into the interiors of the assemblies A, A1, and A2 to thus maintain between the outer and the inner surfaces of the cover sheets of the three assemblies a pressure difference substantially not exceeding one atmosphere. After a predetermined time period the pressure difference between the inner and outer surfaces may be fully equalized by feeding in the aforementioned manner pressure fluid of increased pressure into the interior of the three assemblies. The pressure of the fluid fed into the assemblies' interior may be regulated by the throttling valve 18 provided in the conduit 17, and the pressure in the interior of the autoclave acting on outer surfaces of the cover sheets of the three assemblies and the pressure of the pressure fluid fed into the interior of the assemblies may be checked by the manometers 20 and 24.

It will be understood that each of the elements described above, or two or more together, may also find a useful application in other types of method and apparatus for recapping tires differing from the types described above.

What is claimed as new and desired to be secured by Letters Patents is:

1. A method of recapping tires with prevulcanized profiled treads comprising the steps of forming an assembly consisting essentially of a tire, a profiled tread superimposed upon the outer surface of the tire, and a layer of binder material sandwiched between the outer tire surface and said tread; wrapping a single flexible cover sheet over said assembly so that said cover sheet forms a closed wrapper enclosing all components of said assembly; removing air from said closed wrapper so that sub-atmospheric pressure will be established within said closed wrapper and said components will be pressed by atmospheric pressure substantially without clearance against each other while all air enclosures between said superimposed tire, tread and layer of binder material will be removed; subjecting the assembly in said closed wrapper to heat and gradually increasing outer pressure beyond atmospheric pressure to cause said layer of binder material to permanently bond said tread to said tire surface; and simultaneously increasing the pressure inside said wrapper from said sub-atmospheric pressure to a pressure being substantially 1 kg. per cm.$^2$ lower than said outer pressure so as to maintain during said last-mentioned step a pressure difference of substantially 1 kg. per cm.$^2$ between the inner and outer surface of said sheet so as to avoid distortion of said profiled tread during said treating of the assembly.

2. A method of recapping tires with prevulcanized profiled treads comprising the steps of forming an assembly consisting essentially of a tire, a profiled tread superimposed upon the outer surface of the tire, and a layer of binder material sandwiched between the outer tire surface and said tread; wrapping a single flexible cover sheet over said assembly so that said cover sheet forms a closed wrapper enclosing all components of said assembly; evacuating air from said closed wrapper so that sub-atmospheric pressure will be established within said closed wrapper and said components will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure beyond atmospheric pressure to cause said layer of binder material to permanently bond said tread to said tire surface; and simultaneously increasing the pressure inside and wrapper from said sub-atmospheric pressure to a pressure being substantially 1 kg. per cm.$^2$ lower than said outer pressure so as to maintain during said last-mentioned step a pressure difference of substantially 1 kg. per cm.² between the inner and outer surface of said sheet so as to avoid distortion of said profiled tread during said treating of the assembly.

3. A method of recapping tires with prevulcanized profiled treads comprising the steps of forming an assembly consisting essentially of a tire, a profiled tread superimposed upon the outer surface of the tire, and a layer of binder material sandwiched between the outer tire surface and said tread; wripping a single flexible cover sheet over said assembly so that said cover sheet forms a closed wrapper enclosing all components of said assembly; evacuating air from said closed wrapper so that sub-atmospheric pressure will be established within said closed wrapper and said components will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure beyond atmospheric pressure to cause said layer of binder material to permanently bond said tread to said tire surface; simultaneously increasing the pressure inside said wrapper from said sub-atmospheric pressure to a pressure being substantially 1 kg. per cm.² lower than said outer pressure so as to maintain during said last-mentioned step a pressure difference of substantially 1 kg. per cm.² between the inner and outer surface of said sheet so as to avoid distortion of said profiled tread during said treating of the assembly; and subsequently equalizing the pressure at the inner and outer surface of said cover sheet after a preselected time period.

4. A method of recapping tires with prevulcanized profiled treads comprising the steps of forming an assembly consisting essentially of a tire, a profiled tread superimposed upon the outer surface of the tire, and a layer of binder material sandwiched between the outer tire surface and said tread; wrapping a single flexible cover sheet over said assembly so that said cover sheet forms a closed wrapper enclosing all components of said assembly; evacuating air from said closed wrapper so that said components will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure to cause said layer of binder material to permanently bond said tread to said tire surface; and feeding during increase of the pressure in the autoclave a pressure fluid into the interior of the closed wrapper so as to maintain a pressure difference of substantially 1 kg. per cm.² between the inner and outer surface of said sheet so as to avoid distortion of said profiled tread during said treating of the assembly.

5. A method of recapping tires with prevulcanzied profiled treads comprising the steps of forming an assembly consisting essentially of a tire, a profiled tread superimposed upon the outer surface of the tire, and a layer of binder material sandwiched between the outer tire surface and said tread; wrapping a single flexible cover sheet over said assembly so that said cover sheet forms a closed wrapper enclosing all components of said assembly; evacuating air from said closed wrapper so that said components will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure to cause said layer of binder material to permanently bond said tread to said tire surface; and feeding during increase of the pressure in the autoclave a liquid under pressure into the interior of the closed wrapper so as to maintain a pressure difference of substantially 1 kg. per cm.² between the inner and outer surface of said sheet so as to avoid distortion of said profiled tread during said treating of the assembly.

6. A method of recapping tires with prevulcanized profiled treads having at the outer portion thereof ridges and cavities comprising the steps of forming an assembly consisting essentially of a tire, a profiled tread superimposed upon the outer surface of the tire and a layer of binder material sandwiched between the tire surface and said tread; wrapping a flexible cover sheet over said assembly so that said cover sheet forms a closed wrapper enclosing said assembly and so that said cover sheet engages the outer faces of the ridges of the profiled tread; evacuating air from the interior of said closed wrapper so that the components of the assembly will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure; and feeding a pressure fluid into the interior of said wrapper and into the cavities of the profiled tread to maintain during increase of the pressure in the autoclave a pressure difference of substantially 1 kg. per cm.² between the inner and outer surface of said sheet so as to prevent distortion of the tread portions and unequal pressure on said layer of binder material during increase of the pressure in said autoclave.

7. A method of recapping tires with prevulcanized profiled treads having at the outer portion thereof ridges and cavities comprising the steps of forming an assembly consisting essentially of a tire, a profiled tread superimposed upon the outer surface of the tire, and a layer of binder material sandwiched between the tire surface and said tread; wrapping a flexible cover sheet over said assembly so that said cover sheet forms a closed wrapper enclosing said assembly and so that said cover sheet engages the outer faces of the ridges of the profiled tread; evacuating air from the interior of said closed wrapper so that the components of the assembly will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure; feeding a pressure fluid into the interior of said wrapper and into the cavities of the profiled tread to maintain during increase of the pressure in the autoclave a pressure difference of substantially 1 kg. per cm.² between the inner and outer surface of said sheet so as to prevent distortion of the tread portions and unequal pressure on said layer of binder material during increase of the pressure in said autoclave; and equalizing the pressure at the inner end outer surface of said cover sheet after a preselected time period while maintaining said assembly enclosed in said wrapper in said autoclave.

8. A method of recapping tires with prevulcanized profiled treads having at the outer portion thereof ridges and cavities comprising the steps of forming an assembly consisting essentially of a tire, a profiled tread superimposed upon the outer surface of the tire, and a layer of binder material sandwiched between the tire surface and said tread; wrapping a flexible cover sheet over said assembly so that said cover sheet forms a closed wrapper enclosing said assembly and so that said cover sheet engages the outer faces of the ridges of the profiled tread; said cover sheet being formed with a tubular extension communicating with the interior of said cover sheet; evacuating air from the interior of said closed wrapper through said tubular extension so that the components of the assembly will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure; and feeding a pressure fluid through the same tubular extension into the interior of said wrapper and into the cavities of the profiled tread to maintain during increase of the pressure in the autoclave a pressure difference of substantially 1 kg. per cm.² between the inner and outer surface of said sheet so as to prevent distortion of the tread portions and unequal pressure on said layer of binder material during increase of the pressure in said autoclave.

9. A method of recapping tires with prevulcanized profiled treads having at the outer portion thereof ridges and cavities comprising the steps of forming an assembly consisting essentially of a tire, a profiled tread superimposed upon the outer surface of the tire, a layer of binder material sandwiched between the tire surface and said tread, and a layer of fluid-permeable material over the outer surface of the ridges of said tread and extending to opposite sides of said tread in engagement with the outer tire surface; wrapping a flexible cover sheet over said assembly so that said cover sheet forms a closed wrapper enclosing said assembly and so that said cover sheet engages the outer surface of said layer of fluid-permeable material, said cover sheet being formed with a tubular extension communicating with the interior of said cover sheet at a portion thereof engaging said layer of fluid-permeable material; evacuating air from the interior of said closed wrapper through said tubular extension so that the components of the assembly will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure; and feeding a pressure fluid through the same tubular extension into the interior of said wrapper and into the cavities of the profiled tread to maintain during increase of the pressure in the autoclave a pressure difference of substantially 1 kg. per cm.² between the inner and outer surface of said sheet so as to prevent distortion of the tread portions and unequal pressure on said layer of binder material during increase of the pressure in said autoclave.

10. In an apparatus for recapping tires with prevulcanized profiled treads, in combination, a fluid-tight cover sheet for covering an assembly of a tire, a profiled tread superimposed upon the outer surface of the tire and a layer of binding material between the tire surface and the tread, said cover sheet adapted to form a closed wrapper enclosing said assembly; a tubular member fluid-tightly connected at one end to a portion of said cover sheet and communicating with the interior of said closed wrapper; a source of vacuum; a source of fluid under pressure; and valve means connected to the outer end of said tubular member, to said source of vacuum, and to said source of fluid under pressure for selectively providing communication between the interior of said closed wrapper and said source of vacuum or between the interior of said closed wrapper and of said source of fluid under pressure.

11. In an apparatus as set forth in claim 10 and including autoclave means for receiving said assembly enclosed in said cover sheet for subjecting the enclosed assembly to heat and pressure, said tubular member leading from the interior of said autoclave means to the exterior thereof.

12. A method of recapping tires with prevulcanized profiled treads having at the outer portion thereof grooves and ridges comprising the steps of forming an assembly consisting essentially of a tire, a profiled tread superimposed upon the outer surface of said tire and a layer of binder material sandwiched between the outer tire surface and said tread; wrapping a single flexible cover sheet over said assembly so that said cover sheet forms a closed wrapper enclosing all components of said assembly; evacuating air from said closed wrapper so that said components will be pressed by atmospheric pressures substantially without clearance against each other while all air enclosures between said superimposed tire, tread and layer of binder material will be removed; subjecting said assembly enclosed in said wrapper to heat and increasing outside pressure to cause said layer of binder material to permanently bond said tread to said tire surface; and feeding during increase of the pressure a liquid under pressure into said grooves smaller than the pressure acting at any instant onto the outer surface of said closed wrapper by a pressure difference of at most 1 kg. per cm.² so as to avoid distortion of the tread portions during increase of pressure onto the outer surface of said wrapper.

13. A method of recapping tires with prevulcanized profiled treads having at the outer portion thereof grooves and ridges comprising the steps of forming an assembly consisting essentially of a tire, a profiled tread superimposed upon the outer surface of said tire, and a layer of binder material sandwiched between the tire surface and said tread: wrapping a flexible cover sheet over said assembly so that said cover sheet forms a closed wrapper enclosing said assembly and so that said cover sheet engages the outer faces of the ridges of the profiled tread; evacuating air from the interior of said closed wrapper so that the components of said assembly will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure; and feeding a liquid under pressure into the interior of enclosed wrapper and into the grooves of said profiled tread to maintain during increase of the pressure in the autoclave a pressure difference of substantially 1 kg. per cm.² between the inner and outer surface of said sheet so as to prevent distortion of the tread portions during increase of the pressure in said autoclave.

14. A method of recapping tires with prevulcanized profiled treads having at the outer portion thereof grooves and ridges comprising the steps of forming an assembly consisting essentially of a tire, a profiled tread superimposed upon the outer surface of said tire, and a layer of binder material sandwiched between the tire surface and said tread; wrapping a flexible cover sheet over said assembly so that said cover sheet forms a closed wrapper enclosing said assembly and so that said cover sheet engages the outer faces of the ridges of the profiled tread; evacuating air from the interior of said closed wrapper so that the components of said assembly will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure; feeding a liquid under pressure into the interior of enclosed wrapper and into the grooves of said profiled tread to maintain during increase of the pressure in the autoclave a pressure difference of substantially 1 kg. per cm.² between the inner and outer surface of said sheet so as to prevent distortion of the tread portions during increase of the pressure in said autoclave; and equalizing the pressure at the inner and outer surface of said cover sheet after a preselected time period while maintaining said assembly enclosed in said wrapper in said autoclave.

15. A method of recapping tires with prevulcanized profiled treads having at the outer portion thereof grooves and ridges comprising the steps of forming an assembly consisting essentially of a tire, a profiled tread superimposed upon the outer surface of said tire, and a layer of binder material sandwiched between the tire surface and said tread; wrapping a flexible cover sheet over said assembly so that said cover sheet forms a closed wrapper enclosing said assembly and so that said cover sheet engages the outer faces of the ridges of the profiled tread, said cover sheet being formed with a tubular extension communicating with the interior of said cover sheet; evacuating air through said tubular extension from the interior of said closed wrapper so that the components of said assembly will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure; and feeding a liquid under pressure through the same tubular extension into the interior of enclosed wrapper and into the grooves of said profiled tread to maintain during increase of the pressure in the autoclave a pressure difference of substantially 1 kg. per cm.$^2$ between the inner and outer surface of said sheet so as to prevent distortion of the tread portions during increase of the pressure in said autoclave.

16. A method of recapping tires with prevulcanized profiled treads having at the outer portion thereof grooves and ridges comprising the steps of forming an assembly consisting essentially of a tire, a profiled tread superimposed upon the outer surface of said tire, a layer of binder material sandwiched between the tire surface and said tread, and a layer of fluid-permeable material over the outer surface of the ridges of said tread and extending to opposite sides of said tread into engagement with the outer tire surface; wrapping a flexible cover sheet over said assembly so that said cover sheet forms a closed wrapper enclosing said assembly and so that said cover sheet engages the outer surface of said layer of fluid-permeable material, said cover sheet being formed with a tubular extension communicating with the interior of said cover sheet at a portion thereof engaging said layer of fluid-permeable material; evacuating air from the interior of said closed wrapper so that the components of said assembly will be pressed by atmospheric pressure substantially without clearance against each other while all air enclosures between said superimposed tire, tread and layer of binder material will be removed; placing the assembly enclosed in said wrapper in an autoclave and subjecting it in said autoclave to heat and pressure; and feeding a liquid under pressure through the same tubular extension into the interior of enclosed wrapper and into the grooves of said profiled tread to maintain during increase of the pressure in the autoclave a pressure difference of substantially 1 kg. per cm.$^2$ between the inner and outer surface of said sheet so as to prevent distortion of the tread portions during increase of the pressure in said autoclave.

17. A method of recapping tires with prevulcanized profiled treads comprising the steps of forming an assembly consisting essentially of a tire, a profiled tread superimposed upon the outer surface of the tire, and a layer of binder material sandwiched between the outer tire surface and said tread; wrapping a single flexible cover sheet over said assembly so that said cover sheet forms a closed wrapper enclosing all components of said assembly; evacuating air from said closed wrapper so that a sub-atmospheric pressure will be established in said closed wrapper and said components will be pressed by the higher pressure of the surrounding atmosphere substantially without clearance against each other while all air enclosures between said superimposed tire, tread and layer of binder material will be removed; subjecting the assembly in said closed wrapper to heat and gradually increasing outer pressure beyond atmospheric pressure to cause said layer of binder material to permanently bond said tread to said tire surface; and simultaneously increasing the pressure inside said wrapper from said sub-atmospheric pressure to a pressure being substantially 1 kg. per cm.$^2$ lower than said outer pressure so as to maintain during said last-mentioned step a pressure difference of substantially 1 kg. per cm.$^2$ between the inner and outer surface of said sheet so as to avoid distortion of said profiled tread during said treating of the assembly.

18. A method of recapping tires with prevulcanized profiled treads comprising the steps of forming an assembly consisting essentially of a tire, a profiled tread superimposed upon the outer surface of the tire, and a layer of binder material sandwiched between the outer tire surface and said tread; wrapping a single flexible cover sheet over said assembly so that said cover sheet forms a closed wrapper enclosing all components of said assembly; evacuating air from said closed wrapper so that a sub-atmospheric pressure will be established in said closed wrapper and said components will be pressed by the higher pressure of the surrounding atmosphere substantially without clearance against each other while all air enclosures between said superimposed tire, tread and layer of binder material will be removed; subjecting the assembly in said closed wrapper to heat and gradually increasing outer pressure until an outer pressure of approximately 4 atmospheres is reached so as to cause said layer of binder material to permanently bond said tread to said tire surface; and simultaneously increasing the pressure inside said wrapper from said subatmospheric pressure to a superatmospheric pressure being about 1 kg. per cm.$^2$ lower than said outer pressure of 4 kg. per cm.$^2$ between the inner and outer surface of said sheet so as to avoid distortion of said profiled tread during said treating of the assembly.

19. A method of recapping tires with prevulcanized profiled treads comprising the steps of forming an assembly consisting essentially of a tire outer surface prepared to receive a new tread, a profiled tread superimposed upon the outer surface of the tire, and a layer of binder material sandwiched between the outer tire surface and said tread; placing a single flexible cover sheet in contact with said assembly to cover same; evacuating air from the region between the cover sheet and the assembly so that the components of said assembly are pressed substantially without clearance against each other while air between said tire outer surface, tread and layer of binder material is removed; and subjecting the assembly and cover sheet to heat and external superatmospheric pressure while simultaneously feeding a fluid under pressure into said region beneath said cover sheet such as to maintain a superatmospheric pressure therein which is only slightly smaller than said external superatmospheric pressure so as to avoid distortion of said profiled tread during said treating of the assembly and bonding said tread to said tire surface.

20. A method of recapping tires with prevulcanized profiled treads comprising the steps of forming an assembly consisting essentially of a tire outer surface prepared to receive a new tread, a profiled tread superimposed upon the outer surface of the tire, and a layer of binder material sandwiched between the outer tire surface and said tread; placing a single flexible cover sheet in contact with said assembly to cover same; evacuating air from the region between the cover sheet and the assembly so that the components of said assembly will be pressed by atmospheric pressure substantially without clearance against each other while air between said tire outer surface, tread and layer of binder material will be removed; placing the assembly and cover sheet in an autoclave and subjecting same in said autoclave to heat and pressure to cause said layer of binder material to permanently bond said tread to said tire surface; and feeding during increase of the pressure in the autoclave a fluid under pressure into said region beneath said cover sheet so as to maintain a superatmospheric pressure therein which is only slightly lower than the outer pressure in the autoclave so as to avoid distortion of said profiled tread during said treating of the assembly and bonding said tread to said tire surface.

21. A method of recapping tires with prevulcanized profiled treads comprising the steps of forming an assembly consisting essentially of a tire outer surface prepared to receive a new tread, a profiled prevulcanized tread superimposed upon the outer surface of the tire, and a layer of binder material sandwiched between the outer tire surface and said tread; placing a single flexible cover sheet in contact with said assembly to cover same; evacuating air from the region between the cover sheet and the assembly so that a sub-atmospheric pressure will be established in said region and the components of said assembly will be pressed by the higher external pressure substantially without clearance against each other while air between said tire outer surface, tread and layer of binder material will be removed; subjecting said assembly and cover sheet to heat and gradually increasing outer pressure beyond atmospheric pressure to cause said layer of binder material to permanently bond said tread to said tire surface; and simultaneously increasing the pressure in said region beneath said cover sheet from said sub-atmospheric pressure to a pressure above atmospheric pressure but lower than said outer pressure so as to maintain during said last-mentioned step such a pressure difference between the inner and outer surfaces of said sheet so as to avoid distortion of said profiled tread during the bonding of same to the tire outer surface.

References Cited

UNITED STATES PATENTS

| | | | |
|---|---|---|---|
| 2,966,936 | 1/1961 | Schelkmann | 156—96 |
| 2,976,910 | 3/1961 | Nowak | 156—96 |

FOREIGN PATENTS

| | | |
|---|---|---|
| 555,690 | 9/1943 | Great Britain. |
| 746,375 | 3/1956 | Great Britain. |
| 92,699 | 11/1959 | Netherlands. |

EARL M. BERGERT, *Primary Examiner.*

C. B. COSBY, *Assistant Examiner.*